United States Patent
Monereau et al.

(10) Patent No.: US 8,167,977 B2
(45) Date of Patent: May 1, 2012

(54) PURIFICATION OF AN $H_2$/CO MIXTURE WITH LEAD CONTROL OF THE REGENERATION HEATER

(75) Inventors: Christian Monereau, Paris (FR); Guillaume Rodrigues, Guyancourt (FR); Ingrid Bellec, La Varenne Saint Hilaire (FR); François Demoisy, Chastre (BE)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 396 days.

(21) Appl. No.: 12/522,796

(22) PCT Filed: Jan. 10, 2008

(86) PCT No.: PCT/FR2008/050049
§ 371 (c)(1),
(2), (4) Date: Sep. 29, 2009

(87) PCT Pub. No.: WO2008/099108
PCT Pub. Date: Aug. 21, 2008

(65) Prior Publication Data
US 2010/0024641 A1    Feb. 4, 2010

(30) Foreign Application Priority Data
Jan. 17, 2007 (FR) ...................... 07 52726

(51) Int. Cl.
*B01D 53/04* (2006.01)

(52) U.S. Cl. ............................................ 95/115; 95/148
(58) Field of Classification Search ............. 95/117, 95/139, 148, 114, 115, 236; 96/126, 146; 423/228, 229
See application file for complete search history.

(56) References Cited

U.S. PATENT DOCUMENTS

| | | | |
|---|---|---|---|
| 4,233,038 A | | 11/1980 | Tao |
| 4,380,457 A | * | 4/1983 | Rathborne et al. ............. 95/114 |
| 4,469,665 A | * | 9/1984 | Pinto ............................ 423/359 |
| 5,897,686 A | | 4/1999 | Golden et al. |
| 5,985,007 A | * | 11/1999 | Carrea et al. .................... 96/126 |
| 6,929,668 B2 | | 8/2005 | Millet et al. |
| 2006/0254420 A1 | | 11/2006 | Monereau et al. |
| 2010/0031819 A1 | * | 2/2010 | Monereau et al. ............... 95/92 |

FOREIGN PATENT DOCUMENTS

| | | |
|---|---|---|
| EP | 0862937 | 9/1998 |
| FR | 2805531 | 8/2001 |
| FR | 2856607 | 12/2004 |
| WO | 2006034765 | 4/2008 |

OTHER PUBLICATIONS

Search Report for PCT/FR2008/050049, mailed Jul. 2008.

* cited by examiner

*Primary Examiner* — Frank Lawrence, Jr.
(74) *Attorney, Agent, or Firm* — Elwood Haynes

(57) ABSTRACT

A method of purifying a gaseous mixture rich in hydrogen and in carbon monoxide, commonly termed an $H_2$/CO mixture or syngas, by adsorption prior to treating it cryogenically with a view to producing a CO-rich fraction, and/or one or more $H_2$/CO mixtures of determined content, such as a mixture of 50 mol % $H_2$/50 mol % CO and generally a hydrogen-rich fraction is provided.

21 Claims, 1 Drawing Sheet

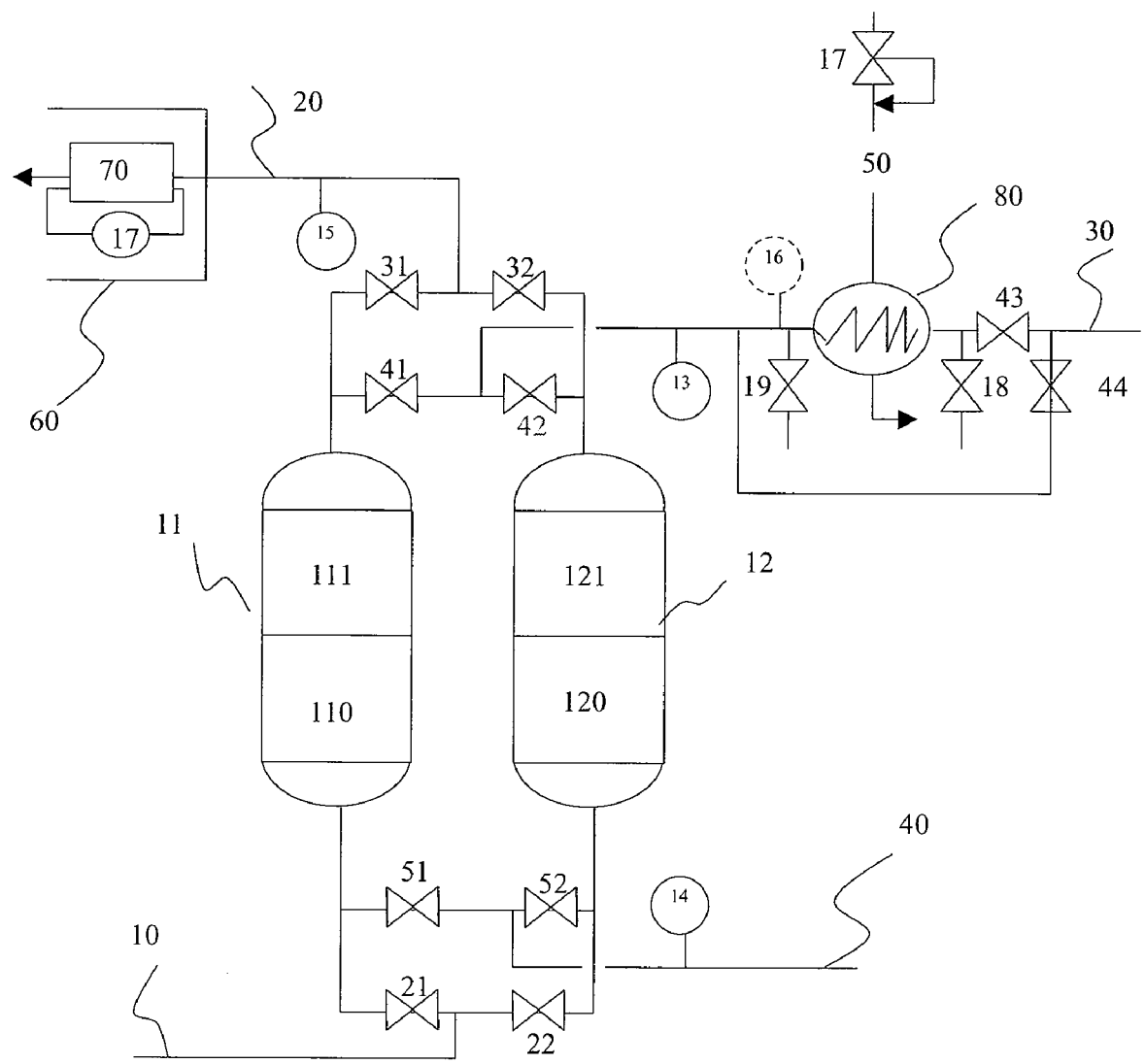

PURIFICATION OF AN $H_2$/CO MIXTURE WITH LEAD CONTROL OF THE REGENERATION HEATER

This application is a §371 of International PCT Application PCT/FR2008/050049, filed Jan. 10, 2008.

FIELD OF THE INVENTION

The invention relates to a method of purifying a gaseous mixture rich in hydrogen and in carbon monoxide, commonly termed an $H_2$/CO mixture or syngas, by adsorption prior to treating it cryogenically with a view to producing a CO-rich fraction, and/or one or more $H_2$/CO mixtures of determined content, such as a mixture of 50 mol % $H_2$/50 mol % CO and generally a hydrogen-rich fraction.

BACKGROUND

More specifically, the invention relates to the operating conditions of the regeneration gas heater associated with such a unit or the operating conditions of a heater that exhibits the same characteristics in terms of the temperature levels and fluids involved.

Mixtures of the syngas type may be obtained in a number of ways, and in particular:
- by $CO_2$ or steam reforming,
- by partial oxidation
- by hybrid methods such as the ATR (Auto Thermal Reforming) method which is a combination of steam reforming with partial oxidation, from gases such as methane or ethane,
- by gasification of coal,
- or recovered as residual gases downstream of acetylene manufacturing units.

Aside from the hydrogen and carbon monoxide by way of main components, numerous impurities such as carbon dioxide, water or methanol often form part of the syngases.

Among purification methods, the method of the TSA (Temperature Swing Adsorption) type is a cyclic method in which each of the adsorbers alternate adsorption steps during which the impurities are held in the adsorbent and regeneration steps during which use is made in particular of a heating phase in order to extract the impurities from the adsorbent. This heating is generally performed by means of a gas known as a regeneration gas which originates from a cryogenic treatment, that is to say, in this case, a hydrogen-rich fraction, a residual gas, a mixture of the two, or a fraction of the purified syngas. In all of these cases, the regeneration gas contains at once hydrogen, carbon monoxide and methane, but in varying proportions. It is also generally used thereafter to cool the adsorbent mass down to its adsorption temperature.

The typical operating cycle for this kind of unit is described in document WO-A-03/049839.

The units for purification methods of the TSA type are generally engineered to obtain a syngas of cryogenic quality, that is to say that, when said syngas is cooled in the cold box, any deposits of impurities are small enough that satisfactory operation of said cold box can be guaranteed for several years, therefore without plugging, and without thermal deterioration to the heat exchange line and without risk to equipment safety.

What that means is a residual $CO_2$ content generally of the order of 0.1 mol ppm maximum and contents which are even lower than a mol ppb level for the other impurities.

In order to limit intervention on these purification units, they are also engineered to have enough of an initial margin that they can operate correctly for several years without the need to replace the adsorbents.

Despite all these precautions, it has been found that the life of these units is appreciably shorter than initially forecast.

In normal operation, a $CO_2$ analyzer checks the purity of the gas produced. It allows the cycle to be modified, for example the adsorption phase to be shortened, if premature $CO_2$ break-throughs associated with a degradation in purification unit performance as mentioned previously are detected. Nonetheless, despite these precautions, it is found that the separation performance of the cold box that performs cryogenic separation of the syngas deteriorates after a few years of operation.

This lack of performance is attributable to a degradation of heat exchange as a result of solids being deposited on the heat exchanger plates.

Shutting down the unit and heating it (to deice it) does solve the problem but this is, of course, expensive if this is not a pre-programmed shut down, because it forces the unit, and therefore production, to be shut down.

Given the margins of safety on the exchangers which are adopted during the design of the cold boxes, these effects are not felt until after the units have been running for a relatively long period of time, longer than 1 year, and more generally of the order of 2 to 3 years. This means that it is impossible to tell whether the entrainment of traces of impurities by the purified syngas, in theory water and $CO_2$, into the cold box occurs after more than one year of operation, after several months, or after operating for just a few weeks.

It has been reported that this degradation is the result of chemical reactions between the adsorbent and the adsorbate and/or of reactions between the components of the syngas which reactions are encouraged by the adsorbent.

The reactivity of $H_2$/CO mixtures at high temperature is indeed well known. Thus, document U.S. Pat. No. 5,897,686 teaches that a number of reactions occur during the repressurization phase of the purification, which is a substep of regeneration. Mention is made therein of the following two reactions in particular:

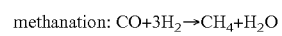

methanation: $CO+3H_2 \rightarrow CH_4+H_2O$

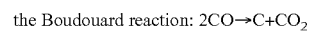

the Boudouard reaction: $2CO \rightarrow C+CO_2$

According to that document, the problem encountered is linked with the formation of water in the adsorbent and the recommended solution is to add a bed of 3A sieve to the top of the adsorber which sieve because it does not absorb CO prevents the in-situ formation of water. That document recommends a regeneration temperature of between 100° C. and 400° C., which conventionally corresponds to a heater skin temperature of the order of 150/200° C. to 450/500° C.

Certain chemical reactions can also be catalyzed by deposits of secondary constituents at the surface of the adsorbents. Deposits of metals such as iron, nickel, copper, etc. facilitate the abovementioned reactions. In the case of some of them, their origin is due to the breakdown of metal-carbonyls formed earlier in the purification process.

Gradual poisoning of adsorbents by traces of impurities that cannot be or can be only imperfectly regenerated is also a plausible hypothesis, given the very high number of products of secondary reactions that may occur in synthesis reactors, that may originate from the coal or natural gas used as a raw material, or that may be entrained by earlier pre-purification methods, such as the methanol scrubbing or amine scrubbing.

Document WO-A-2006/034765 describes a method of purifying a stream of a gas rich in carbon monoxide and in hydrogen, in which method the stream of gas is brought into contact with an adsorption layer containing silica gel and the adsorption layer is regenerated using a gas the temperature of which ranges between 70° C. and 150° C., which corresponds to a heater skin temperature of the order of 150° C. to 200/250° C.

The skin temperature of the heater is defined as the temperature to which the regeneration gas is subjected as it passes through the heater. It is normally kept constant throughout the pressure cycle in order to limit thermal shocks on the exchanger. In the most general case which involves using steam as a means of heating, the steam supplied to the exchanger is kept open. When the regeneration gas is no longer flowing through the exchanger, the temperature gradient across the heat exchange surface becomes practically zero and the skin temperature in practice becomes very close to the steam condensing temperature. It may be considered to be equal to this same temperature. In normal operation, that is to say during heating periods, the temperature gradient across the heat exchange surface is not zero but remains of a secondary order by comparison with the total gradient between the temperature of the steam and the temperature within the gas that is to be heated. The skin temperature can then also be likened to the steam condensing temperature. Use is generally made of saturated or slightly superheated steam. Even when the steam is superheated to a greater extent, for example when the temperature at which it is available is 50° C. higher than its condensing temperature, most of the heat exchange occurs at a skin temperature close to said condensing temperature.

It is also known that, for a given thermal power (Q), the area (S) of heat exchange surface to be installed is in inverse proportion to the temperature differential $\Delta T$ between the skin temperature of the heating surface and the temperature of the regeneration gas in contact with the exchange surface.

Hence, it will be readily understood that, in order to reduce the area of heat exchange surface needed, and therefore the investment, it is necessary to use a skin temperature $T_1$ that is as high as possible. For example, in a refinery, a chemical or petrochemical works, in order to heat a fluid to a temperature of 170° C., it is common practice to use steam at 250/300° C. or even higher.

Despite all the poisoning hypotheses, the main reason why impurities are introduced into the cold box has not yet been clearly identified.

Nonetheless, one of the problems that arise is that of supplying a syngas of cryogenic quality without having to intervene prematurely on the purification units and/or on the cold box by proposing an effective method for purifying an $H_2/CO$ mixture containing at least one impurity, in such a way as to avoid or minimize parasitic reactions.

SUMMARY OF THE INVENTION

The solution of the invention is therefore a method of purifying or of separating a stream of feed gas containing at least one impurity, in which method, periodically:
 a) said stream of feed gas is brought into contact with a first adsorbent in order by adsorption to eliminate at least said impurity,
 b) said purified or separated gas is recovered,
 c) a regeneration gas containing at least hydrogen ($H_2$) and carbon monoxide (CO) is heated using a heater the skin temperature $T_2$ of which is in excess of 150° C.,
 d) the adsorbent from step a) is regenerated using the regeneration gas heated in step c),
 e) the circulation of regeneration gas heated in step c) over the adsorbent of step a) is halted, characterized in that
after step e), at least one of the following additional steps is performed:
 i) the skin temperature of the heater is reduced by at least 25° C. down to a skin temperature $T_1$,
 ii) the heater is purged.

Depending on the circumstances, the method according to the invention may exhibit one of the following features:
 use is made of an electric heater or of a heater with a heat transfer fluid, particularly steam; in this instance, use is preferably made of a steam heater;
 use is made of a steam heater of which the steam pressure in steps i) and/or ii) is lower than the steam pressure used in heating step c);
 after step e), a steam pressure of less than 15 bar, preferably of less than 8 bar, more preferably still of less than 6 bar is applied;
 after step ii), the heater is flushed;
 the purging and/or the flushing are performed using a gas, particularly a fraction of the gas that is to be heated or a gaseous fraction of a composition different from the gas that is to be heated that is reactive or non-reactive; what is meant by a non-reactive gas is a gas not liable to react with the gas that is to be heated or upon contact with the hot surface of the heat exchange tubes or plates, that is to say not liable to create new species not initially present in the gas that is to be heated;
 only additional step ii) is performed and in that the purging is performed using gas that is to be heated just prior to the start of the next heating step c);
 only additional step ii) is performed, possibly followed by a flushing, and in that the purging and/or the flushing are performed using a non-reactive gas;
 the non-reactive gas is chosen from hydrogen, nitrogen or methane;
 after step ii), the liquids that are formed in the heater are purged;
 the partial pressure of CO in the gas heated in step c) is below 2 bar absolute, preferably below 1 bar absolute, more preferably still equal to or below 0.5 bar absolute;
 the feed gas contains at least hydrogen ($H_2$) and carbon monoxide (CO);
 the hydrogen content of feed gas ranges between approximately 30 and 75 mol % and in that the carbon monoxide content ranges between approximately 25 and 60 mol %;
 the feed gas is obtained by steam reforming, by partial oxidation, by gasification of coal or of residues, or by hybrid methods; what is meant by a hybrid method is a combination of steam reforming and partial oxidation;
 the feed gas undergoes a pretreatment such as amine or methanol scrubbing before it is purified.

BRIEF DESCRIPTION OF THE FIGURES

The invention will now be described in greater detail with reference to the attached FIG. 1.

FIG. 1 describes a purification unit for performing the method according to the invention.

DETAILED DESCRIPTION OF THE INVENTION

For a further understanding of the nature and objects for the present invention, reference should be made to the detailed description, taken in conjunction with the accompanying drawing, in which like elements are given the same or analogous reference numbers and wherein:

The syngas from amine scrubbing 10 is directed via the valve 21—with valve 22 closed—toward the adsorber 11 which consists of a bed of activated alumina 110 followed by a bed of zeolite 111 in which beds the water and $CO_2$ contained in the syngas are respectively held and the produced gas thus purified is directed toward the cold box 60 via the valve 31—valve 32 closed—and is then introduced into the main cryogenic exchanger 70.

The regeneration gas, a hydrogen-rich fraction containing CO and $CH_4$, is heated during the heating phase through the steam heater 80 using medium-pressure steam 50. The inlet temperature into the adsorber 12 is regulated by means of a temperature probe 13 and of a circuit that allows the gas entering the adsorber 12 via the valve 42 not to pass via the heater 80. This circuit is controlled by valve 44. At the end of the heating step c), the valve 43 is closed and the cold regeneration gas is directed toward the adsorber 12 beginning to cool the bed of sieve 121 rid of the $CO_2$ previously adsorbed while driving the residual heat front through the bed of activated alumina 120. A temperature probe 14 on the regeneration gas discharge circuit 40 monitors the correct progress of the heating and cooling steps. During the cooling period and any other steps during which the regeneration gas is not heated, or even is not used, such as steps of making the adsorbers produce in parallel, the steam supply to the exchanger is left open. That makes it possible, as already described, to avoid the periodical thermal shocks that cyclic breaks in the steam supply would engender and also makes it possible for the heater to be brought quickly to its nominal operating point.

The regeneration gas heater is generally made of carbon steel, as it is in the case of the unit described here. It could possibly be made of stainless steel or of other material suited to the pressure and temperature conditions and to the nature of the fluids.

To simplify matters, details of the control of the unit and of the transient steps and the corresponding circuits that allow the units before and after the purification unit to operate in a stabilized manner are not described here.

The main constituents of the syngases conventionally treated in units of this type, the hydrogen content remains approximately within the range 30 to 75 mol % and the carbon monoxide within the range 15 to 60 mol %.

As far as the main impurities are concerned, carbon dioxide ($CO_2$) may vary between approximately 5 and 500 mol ppm. If decarbonation is performed by amine scrubbing, the syngas is normally saturated with water. In the case of cryogenic alcohol scrubbing, there may generally be between 20 and 500 mol ppm of it. Of the alcohols, methanol is the most commonplace impurity.

The pressure of the syngas generally ranges between 10 and 70 bar, although a great many units operate at between 15 and 50 bar.

The temperature is in the range 5 to 50° C., more generally between 15 and 40° C. in the case of amine scrubbing and in the range −70 to −20° C. after alcohol scrubbing, general methanol scrubbing. In the latter case, it is also possible to heat the syngas and perform purification at ambient temperature.

The flow rates of syngas to be purified may range from a few hundred $Nm^3/h$ to a few hundred thousand $Nm^3/h$. The particular unit in question here processes a flow rate of about 60 000 $Nm^3/h$.

The adsorbers are generally cylindrical in shape on a vertical axis, but it is possible to use other types such as cylindrical adsorbers with a horizontal axis or radial adsorbers.

According to the invention, it has been revealed that the skin temperature of the heater after step c) of heating the regeneration gas plays a part in the introduction of impurities into the cold box.

Indeed, in the current state of the art, the skin temperature is kept at the same value throughout the cycle, including during the cooling step. During this cooling step, the valve 43 is closed and the valve 44 is open and the cold regeneration gas is directed toward the adsorber 12.

There is therefore gas containing hydrogen and carbon monoxide in contact with the heating surface.

Bearing in mind that the contact time is of the order of one hour or even several hours, appreciable quantities of water, of $CO_2$, and possibly of various alcohols and saturated or unsaturated carbon chains may therefore form in the exchanger. The main reactions involved are known by the name of Fischer-Tropsch (FT) reactions and Water Gas Shift reactions.

If no special precautions are taken, an appreciable amount of these contaminants: water, $CO_2$ and other constituents, for example saturated or unsaturated carbon chains of greater or lesser length will therefore be created in the heater during the cooling step. Not to mention various alcohols. These various impurities are entrained toward the adsorbent that is to be regenerated at the start of heating.

Based on the analysis of the $CO_2$ formed in the heater during the period of non-heating, it has been possible to reveal the predominant effect that the temperate has on both the quantity of $CO_2$ formed and its rate of formation. Temperature also encourages the formation of carbon chains and alcohols. Water is present in all the analyses.

These reactions are very extensive for temperatures of 220° C. or higher, are moderate at around 200° C., slight at 175° C., and around the detection limit at below 150° C.

Measurements of species other than water, particularly of $CO_2$, at contents of several tens of ppm, or even hundreds of ppm in the case of the highest temperatures, and the presence of alcohols and heavy hydrocarbons makes it possible to set aside the hypothesis that water is passing from the steam circuit to the gas circuit, an explanation that was hitherto commonly held to explain the presence of water sometimes discovered in the regeneration gas after heating.

Given the very great affinity that the molecular sieve has for water and polar products, some of this water becomes trapped on the adsorbent despite the high temperature level. During the adsorption phase, some of this water is then entrained toward the cold box by the normally purified gas. Given the lower temperature, of the order of 40 to 45° C., in the case of the unit described above, the content in equilibrium with the previously moistened adsorbent is very low and measured in tens of ppb. However, it is possible with this type of content to build up kilograms of impurities in the heat exchange line and over the course of days to deteriorate the thermal performance of the equipment or even ultimately to plug said heat exchange line.

The above description relates to water but other compounds that have an affinity for the molecular sieve may behave in the same way such as alcohols and heavy or unsaturated hydrocarbons.

Another proportion of the impurities introduced during heating is entrained by the hot gas toward the inlet side of the adsorber and pollutes the entire sieve on its way. At equilibrium, there is therefore a unit with a bed of sieve that is partially polluted with water—or other impurities—on the production side inlet and first layers of adsorbents that are probably aged and/or polluted with various secondary compounds such as those entrained from the units upstream (amines, etc.) or with products of decomposition or reaction of these same compounds (formic acid, etc.). There may at the same time be a degradation over time of the overall performance of said purification that leads, for example, to a reduction in the adsorption phase time in order to prevent the release of $CO_2$ spikes and progressive and ongoing pollution of the cold box through the entrainment of traces of water and possibly of $CO_2$ formed in the regeneration heater.

In the context of the invention, it is possible to use a steam heater, a heater with heat transfer fluid other than water vapor or possibly an electric heater in order to heat the regeneration gas. Sometimes use is made of two heaters in series, a first one being a low pressure steam or hot water heater followed by an electric heater in order to reach the specified temperature. The electric heater can be used just periodically in order to provide more in-depth regeneration.

In the case of a steam heater, the skin temperature is reduced by dropping the steam pressure. To do that, one solution is to fit the steam inlet (50) at the heater (80) with an automatic valve (17) to control the condensing pressure in said heater (80). According to this embodiment of the invention, during the heating phase, that is to say when the regeneration flowrate is passing through the heater (80)—with the valve (43) open—the steam setpoint is increased from a first value P1 to its nominal value Pch, greater than P1. This increase may be performed directly or in steps or along a gradient. When the step c) of heating the regeneration gas is over, the pressure setpoint for the steam is returned to its "rest" value P1. This drop in setpoint may be performed in one step, a number of steps or along a gradient.

In the case of a heater with heat transfer fluid, the skin temperature is decreased by decreasing the temperature of the heat transfer fluid.

Finally, in the case of an electric heater, the question will be that of reducing the skin temperature of the heating elements by using the conventional temperature regulating means belonging to the exchanger.

To limit the formation of impurities in the regeneration heater, only the measurement of the skin temperature is of significance. Indeed, in the event that there is no gas to be heated circulating, the temperature at some arbitrary measurement point for this immobile gas is not representative of the thermal condition within the heater.

There are other means that can be used in place of a drop in skin temperature or to supplement the latter.

Specifically, the drop in skin temperature of the heater when the heater is a steam heater, which it very often is, corresponds to a reduction in the steam pressure in the exchanger. This reduction can be limited by the pressure needed to remove the condensate. Excessive cyclic variations in temperature could also detract from the mechanical integrity of the exchanger over time.

These other means make it possible to avoid the various constituents formed in the steam heater while it is not in service (that is to say between two steps i)), being sent to the adsorbers when, at the start of heating, the regeneration gas is reintroduced into the heater or alternatively to avoid or limit the formation of said constituents.

These means may involve purging the heater after step e)—and before the start of the next heating step c)—and in discharging the gas to the flare or to any other circuit for which the presence of the constituents created within it poses no particular problem. It is simply a matter of replacing the initial gas with some other gas. To do that, 1 to 5 times the volume of gas that the heater can contain can be used. Note that it is preferable to use more than one times the volume of gas of the heater because replacement is rarely effected without the initial gas and the purge gas mixing. It is also possible to purge the heater of the gas it contains by depressurizing it to a low pressure. It is also possible to implement both means, in succession, for example by depressurizing the exchanger first of all and then reintroducing gas in order to repressurize it.

Further, this purge, if it does not take place just before the next heating step c) may be followed by a flushing. What flushing means is circulating a flowrate of gas that is generally lower than the purge flowrate but over a longer period. In general, the flushing flowrate is very much lower than the flowrate of the gas heated in step c).

This flushing or this purging may be done via the valves 18 and 19 depicted in FIG. 1. It may also be done using gas passing through the valve 43 kept open or only partially closed and discharged via the valve 19. This flushing or this purge may be done in conjunction with the dropping of the skin temperature setpoint (or the steam pressure setpoint in the case of a steam heater) described above.

It will be noted that a gas tapping from within, from the inlet or from the outlet of the exchanger, such as a high-speed analysis loop, may constitute a means of flushing within the context of the present invention especially when, in particular, the flowrate of tapped gas alters the impurities content at the exchanger. That can be checked by altering, from one cycle to another, the flowrate of tapped off gas or the duration of the analysis period.

This purge and/or this flushing may be performed using a gas also containing hydrogen and carbon monoxide, particularly using the regeneration gas itself, or using a gas not likely to react upon contact with the hot surface of the heat-exchange tubes or plates. This type of gas will be termed a non-reactive gas. The purge gas may be hydrogen, such as produced by an $H_2$ PSA, or nitrogen or methane. These fluids may be tapped off a nearby network (inerting nitrogen for example) or be fluid from the cryogenic separation unit.

If the gas that is to be heated itself is used as a purge gas, then this purge is preferably done just before starting step d), that is to say just before sending the hot gas that has passed through the heater to the adsorber that is to be regenerated.

When the heater is being purged with a non-reactive gas, this purging may be performed for example just after the end of step e) and be followed by a flushing with this same non-reactive gas, which flushing may be performed throughout the entire time between the end of the purge and the next step c).

Once again, this purging or flushing may be done in conjunction with a drop in steam pressure setpoint.

The heater—and/or its inlet/outlet nozzles—may also be fitted with a means of purging any liquids that may have formed between two successive heating steps, in order to make them easier to remove.

All of these operations (purging, flushing, purging of liquids, etc.) may of course be automated and form an integral part of the operating cycle of the purification or separation method according to the invention.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method of purifying or of separating a stream of feed gas containing at least one impurity, in which method, periodically:

a) contacting said stream of feed gas with a first adsorbent in order by adsorption to eliminate at least said impurity,
b) recovering said purified or separated gas,
c) heating a regeneration gas containing at least hydrogen ($H_2$) and carbon monoxide (CO) using a heater, wherein the heater has a skin temperature $T_2$, wherein the skin temperature $T_2$ is in excess of 150° C.,
d) regenerating the adsorbent from step a) using the regeneration gas heated in step c),
e) halting the circulation of regeneration gas heated in step c) over the adsorbent of step a, wherein after step e), at least one of the following steps is performed:

i) reducing the skin temperature of the heater by at least 25° C. down to a skin temperature $T_1$, and/or
ii) purging the heater.

2. The method of claim 1, wherein use is made of an electric heater or of a heater with a heat transfer fluid.

3. The method of claim 2, wherein said heat transfer fluid is steam.

4. The method of claim 1, wherein use is made of a steam heater of which the steam pressure in steps i) and/or ii) is lower than the steam pressure used in heating step c).

5. The method of claim 4, wherein, after step e), a steam pressure of less than 15 bar is applied.

6. The method of claim 4, wherein, after step e), a steam pressure of less than 8 bar is applied.

7. The method of claim 4, wherein, after step e), a steam pressure of less than 6 bar is applied.

8. The method of claim 1, wherein, after step ii), the heater is flushed.

9. The method of claim 8, wherein the purging and/or the flushing are performed using a fraction of the gas that is to be heated or a gaseous fraction of a composition different from the gas that is to be heated that is reactive or non-reactive.

10. The method of claim 1, wherein only additional step ii) is performed and in that the purging is performed using gas that is to be heated just prior to the start of the next heating step c).

11. The method of claim 8, wherein only additional step ii) is performed, and in that the purging and/or the flushing are performed using a non-reactive gas.

12. The method of claim 1, wherein only additional step ii) is performed, followed by a flushing, and in that the purging and/or the flushing are performed using a non-reactive gas.

13. The method of claim 12, wherein the non-reactive gas is selected from the group consisting of hydrogen, nitrogen and methane.

14. The method of claim 1, wherein, after step ii), the liquids that are formed in the heater are purged.

15. The method of claim 1, wherein the partial pressure of CO in the regeneration gas heated in step c) is below 2 bar absolute.

16. The method of claim 1, wherein the partial pressure of CO in the regeneration gas heated in step c) is below 1 bar absolute.

17. The method of claim 1, wherein the partial pressure of CO in the regeneration gas heated in step c) is below 0.5 bar absolute.

18. The method of claim 1, wherein the feed gas contains at least hydrogen ($H_2$) and carbon monoxide (CO).

19. The method of claim 1, wherein the hydrogen content of feed gas ranges between about 30 and 75 mol % and in that the carbon monoxide content ranges between about 25 and 60 mol %.

20. The method of claim 1, wherein the feed gas is obtained by a process selected from the group consisting of steam reforming, partial oxidation, gasification of coal, gasification of residues, and hybrid methods.

21. The method of claim 1, wherein the feed gas undergoes a pretreatment using amine or methanol scrubbing before it is purified.

* * * * *